(12) United States Patent
Lius et al.

(10) Patent No.: US 11,158,695 B2
(45) Date of Patent: Oct. 26, 2021

(54) DISPLAY DEVICE HAVING BIOMETRIC SENSORS

(71) Applicant: InnoLux Corporation, Miao-Li County (TW)

(72) Inventors: Chandra Lius, Miao-Li County (TW); Kuan-Feng Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 130 days.

(21) Appl. No.: 16/371,149

(22) Filed: Apr. 1, 2019

(65) Prior Publication Data
US 2020/0312936 A1 Oct. 1, 2020

(51) Int. Cl.
| | |
|---|---|
| *G06F 3/042* | (2006.01) |
| *H01L 27/32* | (2006.01) |
| *G06F 21/32* | (2013.01) |
| *G06K 9/00* | (2006.01) |
| *G09G 3/3275* | (2016.01) |
| *H01L 21/70* | (2006.01) |
| *H01L 29/66* | (2006.01) |

(Continued)

(52) U.S. Cl.
CPC ........ *H01L 27/3262* (2013.01); *G06F 3/0416* (2013.01); *G06F 21/32* (2013.01); *G06K 9/0002* (2013.01); *G09G 3/3275* (2013.01); *H01L 21/702* (2013.01); *H01L 27/3272* (2013.01); *H01L 29/66757* (2013.01); *H01L 29/786* (2013.01); *H01L 2924/13069* (2013.01); *H01L 2924/1426* (2013.01)

(58) Field of Classification Search
CPC ... G06F 3/0416; G06F 21/32; H01L 51/0097; H01L 27/3262; H01L 21/702; H01L 27/3272; H01L 29/66757; H01L 29/786; H01L 2924/13069; H01L 2924/1426; G06K 9/0004; G06K 9/0002; G09G 3/3275
USPC ........................................................ 345/175
See application file for complete search history.

(56) References Cited

U.S. PATENT DOCUMENTS

| | | | |
|---|---|---|---|
| 10,216,975 B1 | 2/2019 | He | |
| 2011/0109592 A1* | 5/2011 | Kurokawa | G06F 3/0416 345/175 |

(Continued)

FOREIGN PATENT DOCUMENTS

WO 2017/211152 A1 12/2017

OTHER PUBLICATIONS

Pranav Koundinya et al., Multi Resolution Touch Panel with Built-in Fingerprint Sensing Support, 2014, EDAA, XP055575836.

*Primary Examiner* — Abdul-Samad A Adediran
(74) *Attorney, Agent, or Firm* — Winston Hsu

(57) ABSTRACT

A display device has a display region and a side region adjacent to the display region and includes a plurality of display units, a plurality of sensing units, a display driver and a sensor driver. The plurality of display units and the plurality of sensing units are disposed in the display region. The display driver is coupled to at least a portion of the plurality of display units, and includes a plurality of first thin-film transistors having a first channel layer. The sensor driver is coupled to at least a portion of the plurality of sensing units, and includes a plurality of second thin-film transistors having a second channel layer. At least a portion of the plurality of first thin-film transistors and at least a portion of the plurality of second thin-film transistors are disposed in the side region.

19 Claims, 12 Drawing Sheets

(51) Int. Cl.
*H01L 29/786* (2006.01)
*G06F 3/041* (2006.01)

(56) References Cited

U.S. PATENT DOCUMENTS

| | | |
|---|---|---|
| 2016/0266695 A1 | 9/2016 | Bae |
| 2017/0084774 A1 | 3/2017 | Im |
| 2018/0101271 A1 | 4/2018 | Tsai |
| 2018/0151656 A1 | 5/2018 | Choo |
| 2018/0165496 A1 | 6/2018 | Cheng |
| 2018/0211088 A1 | 7/2018 | Cho |
| 2020/0143135 A1* | 5/2020 | Kim ................... G06K 9/0004 |
| 2020/0150481 A1* | 5/2020 | You ................... H01L 51/0097 |

* cited by examiner

DISPLAY DEVICE HAVING BIOMETRIC SENSORS

CROSS REFERENCE TO RELATED APPLICATION

Background of the Disclosure

1. Field of the Disclosure

The disclosure relates to touchscreen devices, and specifically, to a display device having biometric sensors.

2. Description of the Prior Art

The growing demand for information security and information privacy has driven use of biometric authentication on electronic devices such as smartphones, laptops, tablets, banking devices, and gaming consoles. A popular form of biometric authentication is fingerprint identification. Recently, fingerprint sensors have been adopted by various electronic devices so that the electronic devices can be unlocked by device owners via fingerprint authentication, protecting the electronic devices from unauthorized access.

Conventionally, a fingerprint sensor is provided separately from a display screen on a display device, so a screen-locked display device can be unlocked by simply touching the fingerprint sensor. Nevertheless, it is of great interest to display device manufacturers and users to combine a fingerprint sensor into a display screen, thereby increasing a display region of a display device and offering a narrow-frame or frame-less design of non-display region of the display device.

Therefore, a need has arisen for a display device to incorporate biometric sensors, reducing the size of a frame of the display device while providing biometric authentication to protect against unauthorized access to the display device.

SUMMARY OF THE DISCLOSURE

The embodiment provides a display device having a display region and a side region adjacent to the display region. The display device includes a plurality of display units, a plurality of sensing units, a display driver and a sensor driver. The plurality of display units and the plurality of sensing units are disposed in the display region. The display driver is coupled to at least a portion of the plurality of display units, and includes a plurality of first thin-film transistors having a first channel layer. The sensor driver is coupled to at least a portion of the plurality of sensing units, and includes a plurality of second thin-film transistors having a second channel layer. At least a portion of the plurality of first thin-film transistors and at least a portion of the plurality of second thin-film transistors are disposed in the side region.

These and other objectives of the present disclosure will no doubt become obvious to those of ordinary skill in the art after reading the following detailed description of the embodiment that is illustrated in the various figures and drawings.

DETAILED DESCRIPTION

The following embodiments when read with the accompanying drawings are made to clearly exhibit the above-mentioned and other technical contents, features and effects of the present disclosure. Through the exposition by means of the specific embodiments, people would further understand the technical means and effects of the present disclosure to achieve the above-indicated objectives. Moreover, as the contents disclosed herein should be readily understood and can be implemented by a person skilled in the art, all equivalent changes or modifications which do not depart from the concept of the present disclosure should be encompassed by the appended claims.

Furthermore, the ordinals recited in the specification and the claims such as "first", "second" to "sixth" and so on are intended only to describe the elements claimed and imply or represent neither that the claimed elements have any proceeding ordinals, nor that sequence between one claimed element and another claimed element or between steps of a manufacturing method. The use of these ordinals is merely to differentiate one claimed element having a certain designation from another claimed element having the same designation. It will be understood that when an element or layer is referred to as being "disposed on" another element or layer, it can be directly disposed on the other element or layer, or intervening elements or layers may be present. In contrast, when an element is referred to as being "directly disposed on" another element or layer, there are no intervening elements or layers exist. As used herein, the term "coupled to" is equivalent to "electrically connected" in the disclosure.

Figure 1:
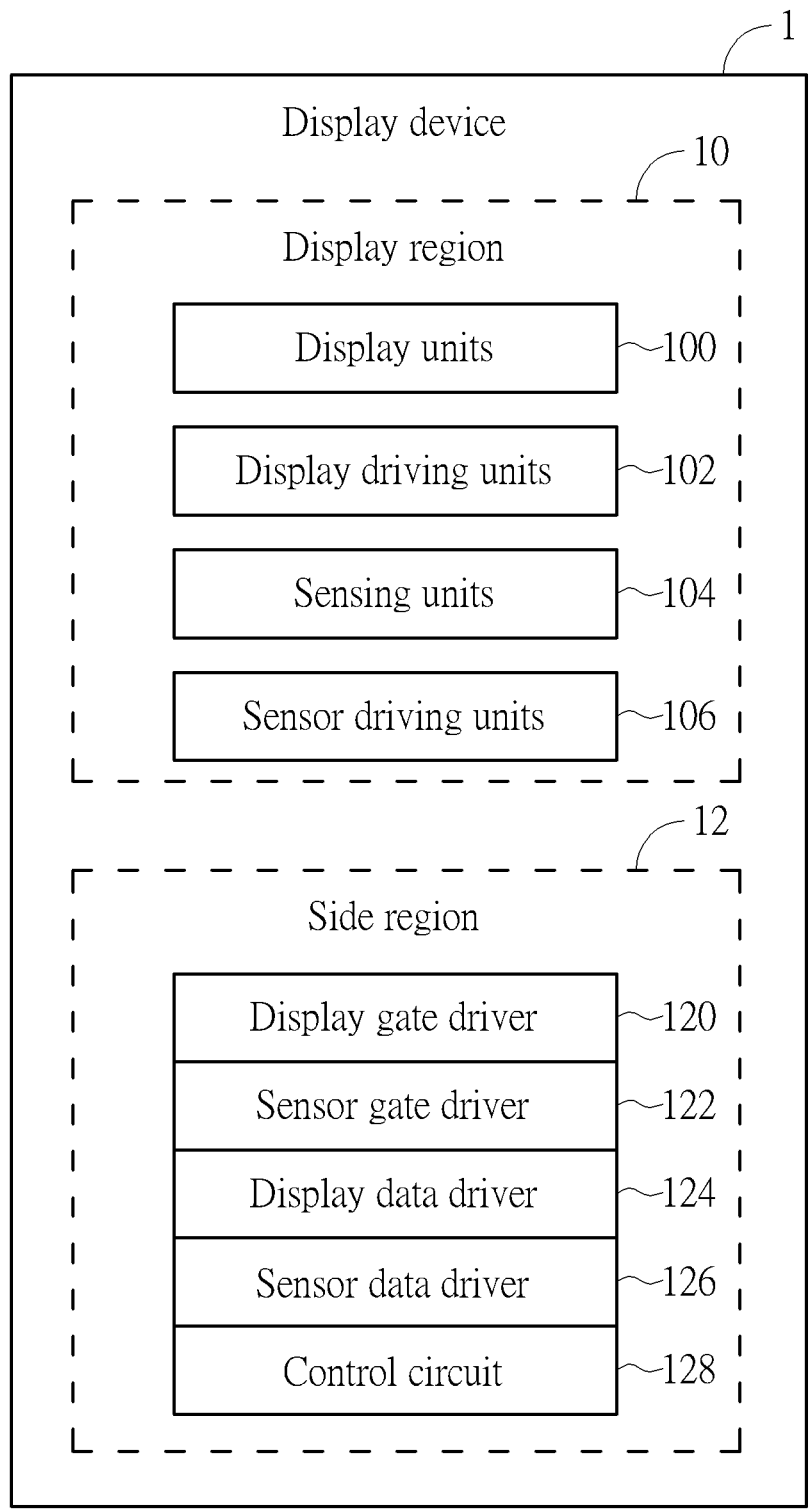
FIG. 1 is a block diagram of a display device according to an embodiment of the disclosure.

FIG. 1 is a block diagram of a display device 1 according to an embodiment of the disclosure. The display device 1 has a display region 10 and a side region 12 adjacent to the display region 10. The display device 1 has biometric sensors which combines functions of image displaying and image sensing on the display region 10. In one embodiment, The display device 1 can also be a liquid-crystal display (LCD) device, an organic light-emitting diode (OLED) display device, an inorganic LED mini-LED display device (ex. A mini-LED panel device, a micro-LED panel device, or a quantum dot LED panel device), but it is not limited thereto. In another embodiment, a shape of the display region 10 or the display device 1 could be a rectangle, a square, a circular, or a free form, but it is not limited thereto. The display region 10 may be a display screen area of the display device 1 and the side region 12 may be at least one portion of a non-display region outside the display region 10. Specifically, the display device 1 comprises a plurality of display units 100, a plurality of display driving units 102, a plurality of sensing units 104 and a plurality of sensor driving units 106 disposed in the display region 10, and a display gate driver 120, a sensor gate driver 122, a display data driver 124, a sensor data driver 126, and a control circuit 128 disposed in the side region 12.

The plurality of display driving units 102 may be thin-film transistors for respectively driving the plurality of display units 100 to display an image on the display region 10. The plurality of sensor driving units 106 may be thin-film transistors for respectively driving the plurality of sensing units 104 to detect an image such as a fingerprint. In one embodiment, at least one of the thin-film transistors comprises an amorphous thin-film transistor, a low-temperature polysilicon thin-film transistor, or a metal-oxide thin-film transistor, but it is not limited thereto. The display gate driver 120 may be coupled to a portion of the plurality of display units 100 and may comprise a plurality of first thin-film transistors to select display units 100 via corresponding display driving units 102, and the display data driver 124 may be coupled to the portion of the plurality of display units 100 and may comprise multiplexers or switches to load image data to the selected display units 100. Similarly, the sensor gate driver 122 may be coupled to a portion of the plurality of sensing units 104 and may comprise a plurality of second thin-film transistors to select sensing units 104 via corresponding sensor driving units 106, and the sensor data driver 126 may be coupled to a portion of the plurality of sensing units 104 and may comprise multiplexers or switches to read detected signals from the selected sensing units 104. The control circuit 128 may be an image processor, a digital signal processor, a central processing unit or a microprocessor. The control circuit 128 may be coupled to the display gate driver 120, the sensor gate driver 122, the display data driver 124, and the sensor data driver 126 to control the plurality of display units 100 and the plurality of sensing units 104. At least a portion of the plurality of first thin-film transistors and at least a portion of the plurality of second thin-film transistors are disposed in the side region 12.

As used herein, a display driver may refer to the display gate driver 120 or the display data driver 124, and a sensor driver may refer to the sensor gate driver 122 or the sensor data driver 126. Various embodiments of circuit layouts of the display device 1 are provided in FIGS. 2 through 5 and 7 through 10 to illustrate how the display driver and the sensor driver can share the side region 12 efficiently while delivering desired signal quality.

Figure 2:
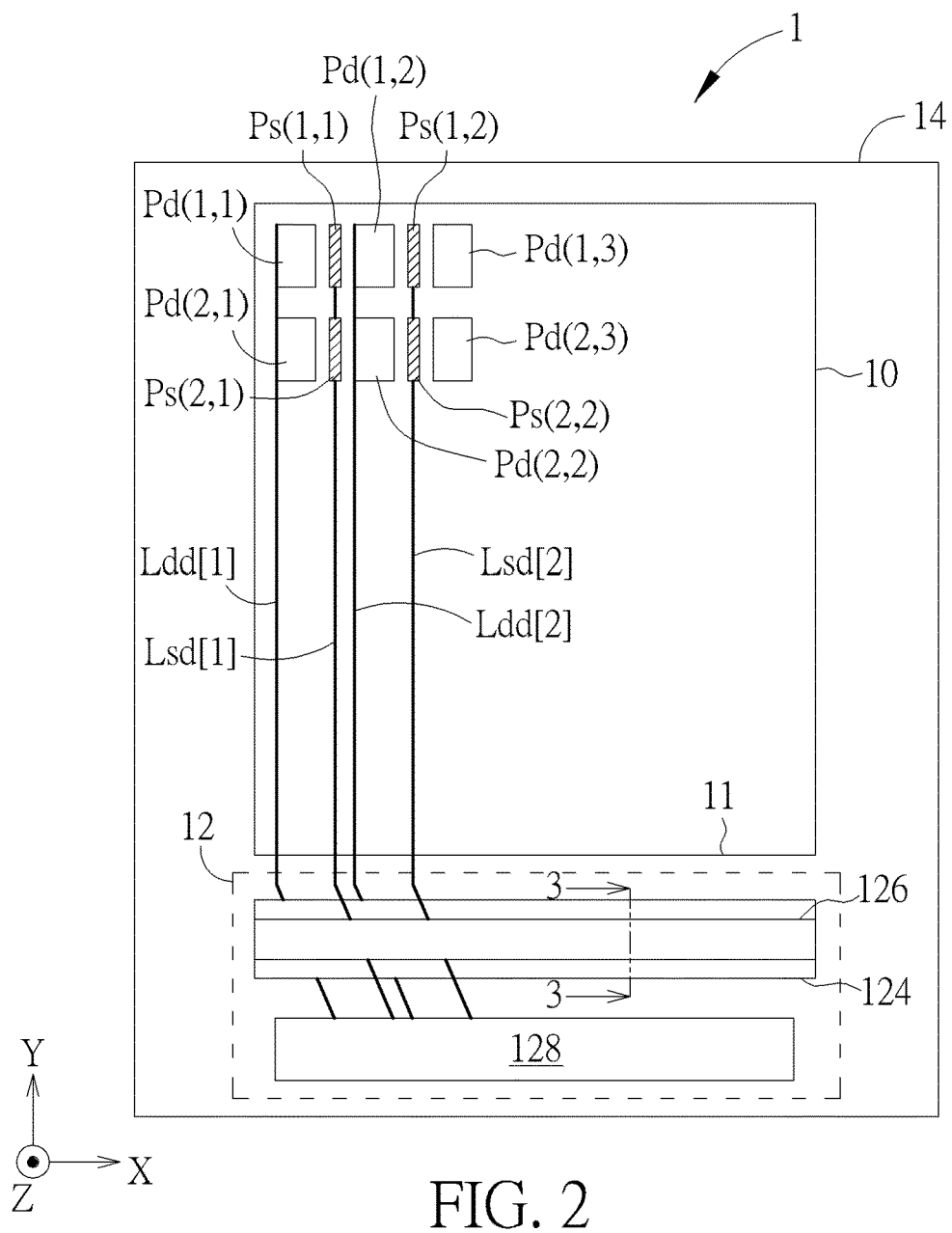
FIG. 2 shows a top view of an exemplary circuit layout of the display device in FIG. 1.
Figure 3:
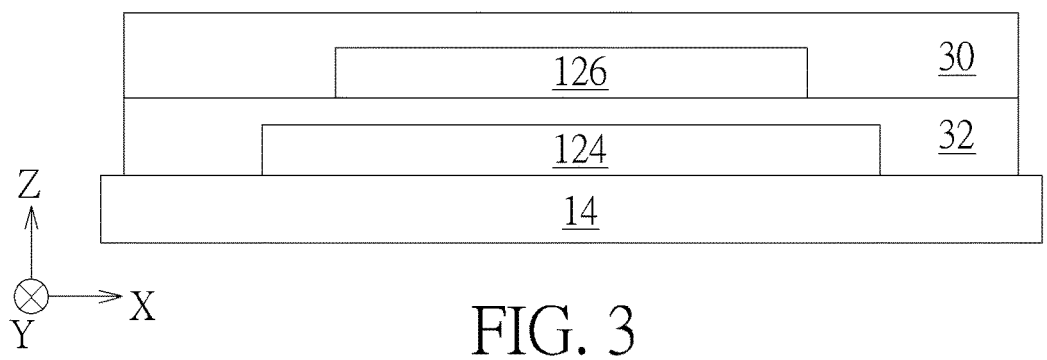
FIG. 3 shows a cross-sectional view of the circuit layout of the display device in FIG. 2 along line 3-3'.

FIG. 2 shows a top view of an exemplary circuit layout of the display device 1, FIG. 3 shows a cross-sectional view of the circuit layout of the display device 1 along line 3-3'. FIG. 2 shows that the display device 1 further comprises an array substrate 14. The display data driver 124, the sensor data driver 126 and the control circuit 128 share the side region 12. The side region 12 is one portion of a non-display region surrounding the display region 10, for example, the portion is disposed adjacent to a bottom side 11 of the display region 10. The sensor data driver 126 is disposed on the display data driver 124 from the top view direction of the display device 1. FIG. 3 shows that the display device 1 further comprises a first insulating layer 32 and a second insulating layer 30 sequentially disposed on the array substrate 14. The cross-sectional view in FIG. 3 also shows that the sensor data driver 126 and the display data driver 124 are disposed on the array substrate 14 and are at least partially overlapping with each other from the top view direction of the display device 1. The first insulating layer 32 and the second insulating layer 30 may comprise silicon nitrides (SiNx), silicon oxides (SiOx), or a combination thereof, and may have a plurality of layers.

In FIG. 2, the top view shows that display sub-pixels Pd(1,1), Pd(1,2), Pd(1,3), Pd(2,1), Pd(2,2), Pd(2,3) and sensor pixels Ps(1,1), Ps(1,2), Ps(2,1), Ps(2,2) may be arranged in a matrix form, a free form (not shown), or combination thereto in the display region 10. Each of the display sub-pixels Pd(M,N) may comprise a display unit 100 and a display driving unit 102, and may be one of red, green and blue (RGB) sub-pixels, where M and N are positive integers and respectively represent row and column indexes of the matrix of display sub-pixels. Specifically, the RGB sub-pixels may be arranged according to a fixed alternate sub-pixel layout. The control circuit 128 and the display data driver 124 may be coupled to display sub-pixels Pd(1,1), Pd(2,1) in a first column via a display data line Ldd[1], to display sub-pixels Pd(1,2), Pd(2,2) in a second column via a display data line Ldd[2], and to display sub-pixels Pd(1,3), Pd(2,3) in a third column via a display data line Ldd[3]. Likewise, each of the sensor pixels Ps(P,Q) may comprise a sensing unit 104 and a sensor driving unit 106, and P and Q are positive integers and respectively represent row and column indexes of the matrix of sensor sub-pixels. The control circuit 128 and the sensor data driver 126 may be coupled to sensor pixels Ps(1,1), Ps(2,1) in a first column via a sensor data line Lsd[1], and to sensor pixels Ps(1,2), Ps(2,2) in a second column via a sensor data line Lsd[2]. The display sub-pixels Pd(M,N) and the sensor pixels Ps(P,Q) may be arranged alternately along each row of the matrix, but it is not limited thereto.

The overlapping configuration of the sensor data driver 126 and the display data driver 124 leads to a reduction in the area of the side region 12, thereby shrinking the size of the display device 1. Note that the circuit layout of the display device 1 is not limited to the overlapping configuration as shown in FIGS. 2 and 3, but the sensor data driver 126 and the display data driver 124 may also be not overlapping with each other from the top view direction of the display device 1. The top view direction is the direction of observation in FIG. 2. Moreover, the sensor data driver 126 and the display data driver 124 may be disposed between the display region 10 and the control circuit 128 from the top view direction of the display device 1. The display data driver 124 and the sensor data driver 126 other than a data line switching circuit and a readout switching circuit may be integrated with the control circuit 128 into an integrated circuit. The data line switching circuit of the display data driver 124 and the readout switching circuit of the sensor data driver 126 may be disposed on display region 10. Further note that the number of the display sub-pixels Pd(M,N) and the number of the sensor pixels Ps(P,Q) are not limited to those provided in FIGS. 2 and 3, any number of the display sub-pixels Pd(M,N) and the sensor pixels Ps(P, Q) may be adopted in the display device 1, and the dimension of the matrix of the display sub-pixels Pd(M,N) may be the same as or different from that of the sensor pixels Ps(P,Q).

Figure 4:
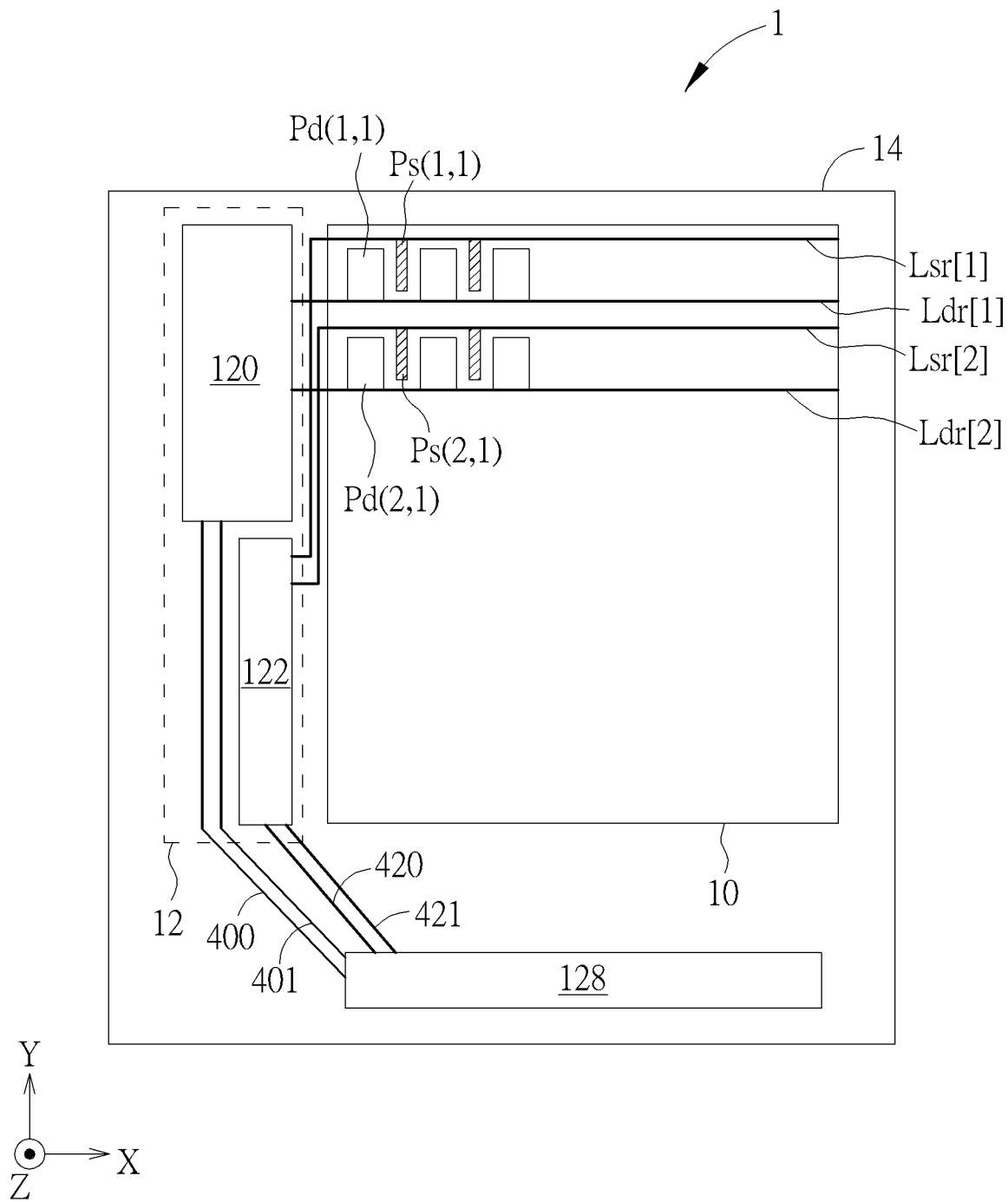
FIG. 4 shows a top view of another exemplary circuit layout of the display device in FIG. 1.
Figure 5:
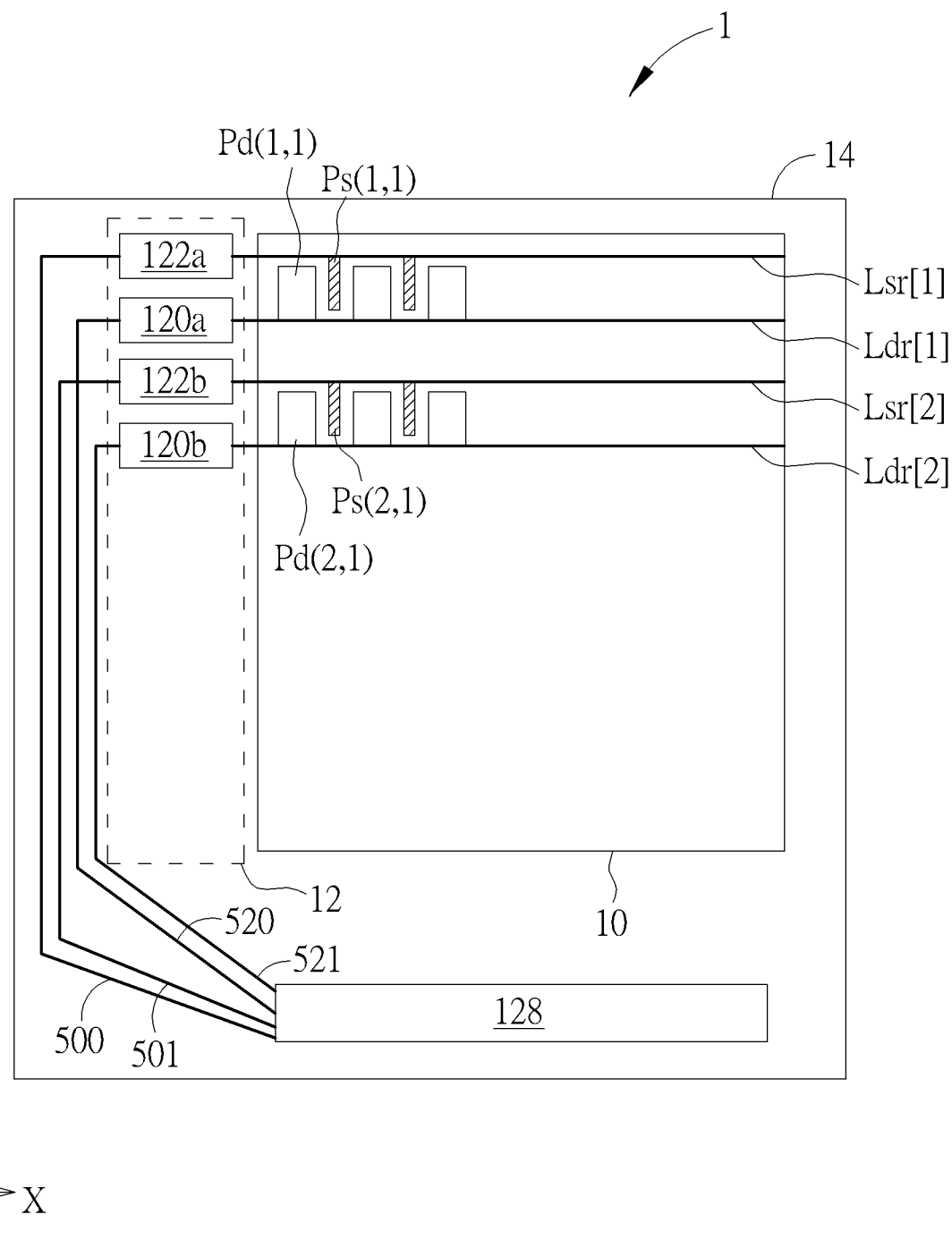
FIG. 5 shows a top view of another exemplary circuit layout of the display device in FIG. 1.

FIGS. 4 and 5 show top views of two exemplary circuit layouts of the display device 1, where the display gate driver 120 and the sensor gate driver 122 share the side region 12 and are not overlapping with each other, and the side region 12 is disposed on one side (for example, left side) of the display device 1. The internal circuit configuration of display sub-pixels Pd(M,N) and sensor pixels Ps(P, Q) are similar to that in FIG. 2, and the detailed explanation therefor is omitted here for simplicity. A top view plane of the display device 1 has an x-direction (ex: first direction) and a y-direction (ex: second direction) perpendicular thereto. The top view plane is the plane of observation in FIG. 4 or 5.

In FIG. 4, the display gate driver 120 and the sensor gate driver 122 are disposed along the y-direction. The display gate driver 120 may be coupled to display sub-pixels Pd(M,N) in a first row via a display gate line Ldr[1] and to display sub-pixels Pd(M,N) in a second row via a display gate line Ldr[2]. Likewise, the sensor gate driver 122 may be coupled to sensor pixels Ps(P,Q) in a first row via a sensor gate line Lsr[1] and to sensor pixels Ps(P, Q) in a second row via a sensor gate line Lsr[2]. The control circuit 128 is coupled to the display gate driver 120 and the sensor gate driver 122 via connecting members 400, 401, 420, 421 to select each row of the display sub-pixels Pd(M,N) and each row of the sensor pixels Ps(P,Q), respectively. In FIG. 5, the display gate driver 120 and the sensor gate driver 122 are respectively grouped into display sub-gate drivers 120a, 120b and sensor sub-gate drivers 122a, 122b, and the display sub-gate drivers 120a, 120b and the sensor sub-gate drivers 122a, 122b are arranged alternately and aligned along the y-direction. The display sub-gate drivers 120a, 120b and the sensor sub-gate drivers 122a, 122b may be arranged alternately in unequal quantities. For example, 3 sub-gate drivers 120a and 2 sensor sub-gate drivers 122a may be arranged alternately, and 3 sub-gate drivers 120b and 2 sensor sub-gate drivers 122b may be arranged alternately. The display sub-gate driver 120a may be coupled to display sub-pixels Pd(M,N) in a first row via a display gate line Ldr[1] and the display sub-gate driver 120b may be coupled to display sub-pixels Pd(M,N) in a second row via a display gate line Ldr[2]. Likewise, the sensor sub-gate driver 122a may be coupled to sensor pixels Ps(P,Q) in a first row via a sensor gate line Lsr[1] and the sensor sub-gate driver 122b may be coupled to sensor pixels Ps(P,Q) in a second row via a sensor gate line Lsr[2]. The control circuit 128 is respectively coupled to the display sub-gate drivers 120a, 120b and the sensor sub-gate drivers 122a, 122b via connecting members 500, 501, 520, 521 to select each row of the display sub-pixels Pd(M,N) and each row of the sensor pixels Ps(P,Q).

The circuit layouts of the sensor data driver 126 and the display data driver 124 as in FIGS. 4 and 5 provides a narrow-frame design (smaller non-display region or side region 12) for the display device 1. Note that the circuit layout of the display device 1 is not limited to those in FIGS. 4 and 5, but the display gate driver 120 and the sensor gate driver 122 may also be arranged into a stacked configuration. In addition, the side region 12 may be split into first and second side sub-regions arranged at opposite sides of the display region 10, and the display gate driver 120 and the sensor gate driver 122 may be respectively split into two parts, so that first parts of the display gate driver 120 and the sensor gate driver 122 may be disposed in the first side sub-region to control scan data of one half of the display units 100 and the sensing units 104, and second parts of the display gate driver 120 and the sensor gate driver 122 may be disposed in the second side sub-region to control scan data of the other half of the display units 100 and the sensing units 104. The circuit layout of the split parts of the display gate driver 120 and the sensor gate driver 122 in either side sub-region may be arranged in any layout form as discussed in FIGS. 4 and 5. Moreover, the display data driver 124 and the sensor data driver 126 other than a data line switching circuit and a readout switching circuit may be integrated with the control circuit 128 into an integrated circuit. The data line switching circuit of the display data driver 124 and the readout switching circuit of the sensor data driver 126 may be disposed on display region 10. Further note that the number of display sub-pixels Pd(M,N) and the number of sensor pixels Ps(P,Q) are not limited to those provided in FIGS. 4 and 5, any number of display sub-pixels Pd(M,N) and sensor pixels Ps(P,Q) may be adopted in the display device 1, and the dimension of the matrix of the display sub-pixels Pd(M,N) may be the same as or different from that of the sensor pixels Ps(P,Q). Any combination of the circuit layouts of the display gate driver 120, the sensor gate driver 122, the display data driver 124, and the sensor data driver 126 as disclosed in FIGS. 2 through 5 may be adopted in the display device 1.

Figure 6:
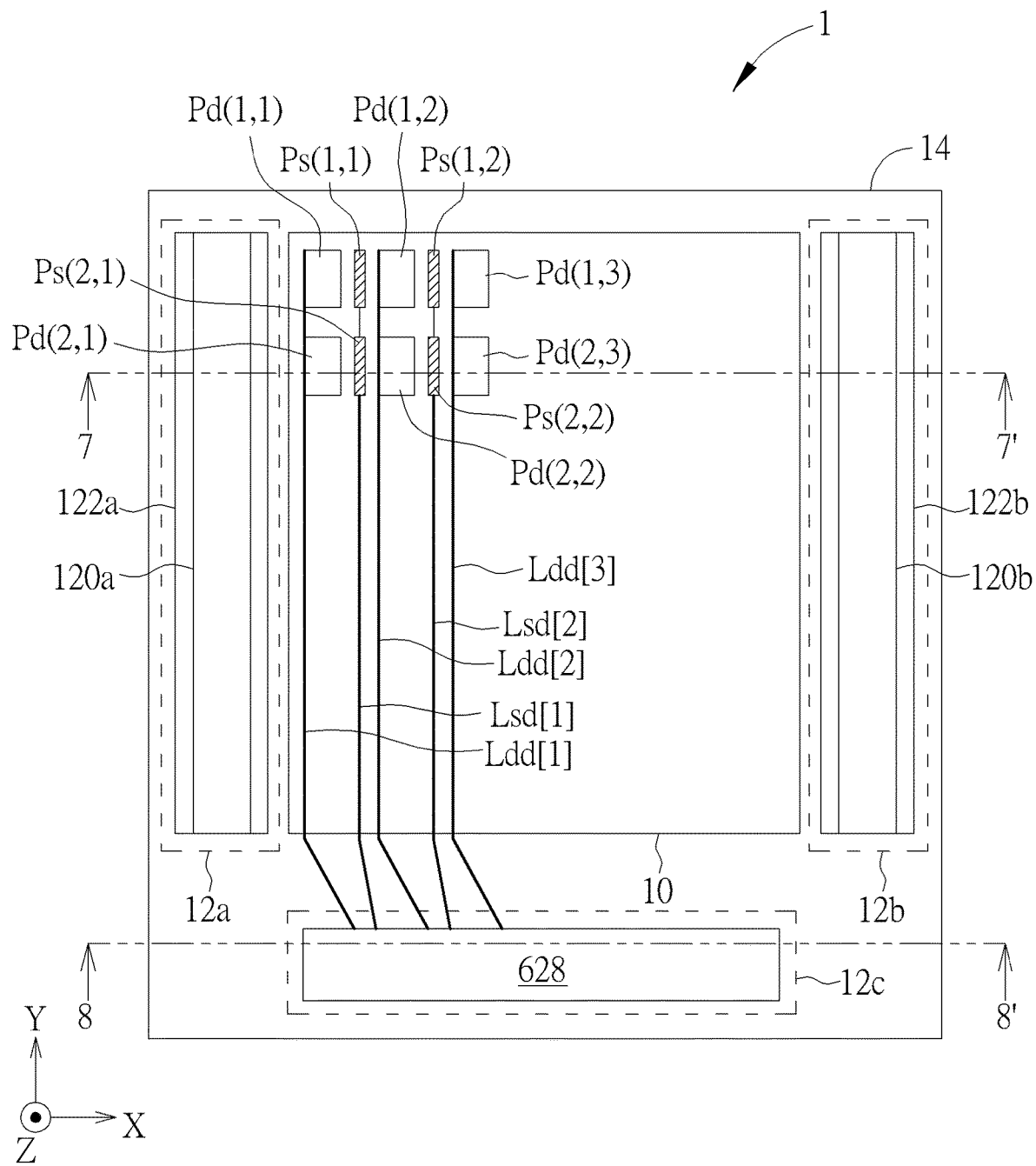
FIG. 6 shows a top view of another exemplary circuit layout of the display device in FIG. 1.
Figure 7:
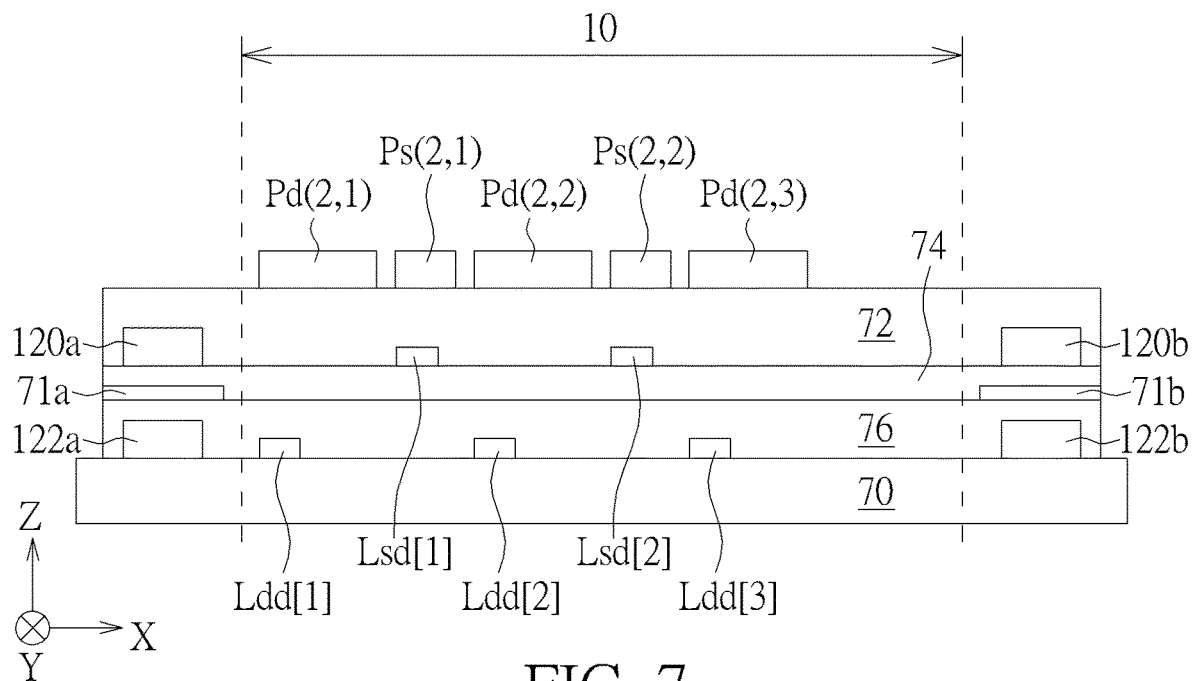
FIG. 7 shows a cross-sectional view of the circuit layout of the display device in FIG. 6 along line 7-7'.
Figure 8:
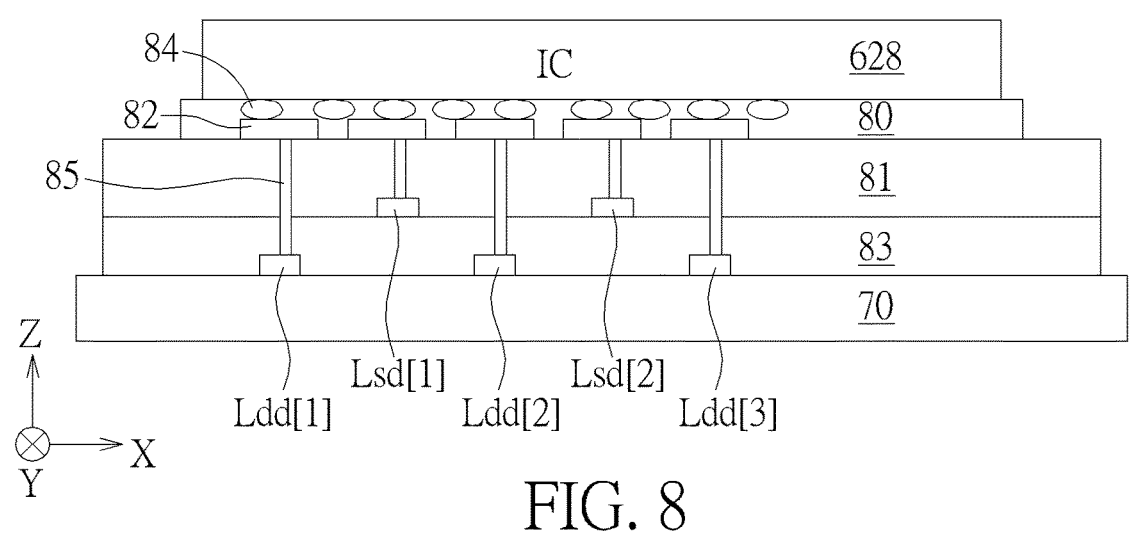
FIG. 8 shows another cross-sectional view of the circuit layout of the display device in FIG. 6 along line 8-8'.

FIG. 6 shows a top view of another exemplary circuit layout of the display device 1, FIG. 7 shows a cross-sectional view of the circuit layout of the display device 1 in FIG. 6 along line 7-7', and FIG. 8 shows another cross-sectional view of the circuit layout of the display device 1 in FIG. 6 along line 8-8'. Side sub-regions 12a and 12b are aligned along the x-direction and at opposite sides of the display region 10, and a side sub-region 12c and the display region 10 are aligned along the y-direction. In FIG. 6, the display gate driver 120a and the sensor gate driver 122a are overlapping with each other in the side sub-region 12a, the display gate driver 120b and the sensor gate driver 122b are overlapping with each other in the side sub-region 12b. The display data driver 124, the sensor data driver 126 and the control circuit 128 are integrated into an integrated circuit 628 disposed in the side sub-region 12c. The integrated circuit 628 is coupled to display sub-pixels Pd(1,1), Pd(2,1) via a display data line Ldd[1], display sub-pixels Pd(1,2), Pd(2,2) via a display data line Ldd[2] and display sub-pixels Pd(1,3), Pd(2,3) via a display data line Ldd[3]. Further, the integrated circuit 628 is coupled to sensor sub-pixels Ps(1,1), Ps(2,1) via a sensor data line Lsd[1] and sensor sub-pixels Pd(1,2), Ps(2,2) via a sensor data line Lsd[2]. The internal circuit configuration of display sub-pixels Pd(M,N) and sensor pixels Ps(P,Q) are similar to that in FIG. 2, and the detailed explanation therefor is omitted here for simplicity.

The overlapping circuit layout, despite being compact in size, can cause interference and degrade signal quality when the overlapping circuit switches between states. As indicated in FIG. 7, in order to reduce interference, shielding layers 71a, 71b and/or insulating layers 72, 74, 76 are provided between the overlapping display gate driver 120a and sensor gate driver 122a, and between the overlapping display gate driver 120b and sensor gate driver 122b. The insulating layers 76, 74, 72 may be sequentially disposed on a substrate 70, and may comprise an organic material, an inorganic material or a combination thereof. The shielding layer 71a is disposed between at least a portion of the plurality of first thin-film transistors in the display gate driver 120a and at least a portion of the plurality of second thin-film transistors in the sensor gate driver 122a. Similarly, the shielding layer 71b is disposed between at least a portion of the plurality of first thin-film transistors in the display gate driver 120b and at least a portion of the plurality of second thin-film transistors in the sensor gate driver 122b. Specifically, the shielding layers 71a, 71b may extend throughout an area between the at least the portion of the plurality of first thin-film transistors in the display gate drivers 120a, 120b and the at least the portion of the plurality of second thin-film transistors in the sensor gate drivers 122a, 122b, respectively. Further, the shielding layers 71a, 71b may be overlapping with the display gate drivers 120a, 120b and the sensor gate drivers 122a, 122b in the z-direction in FIG. 7. In other embodiments, the shielding layers 71a, 71b may be disposed between each of the at least the portion of the plurality of first thin-film transistors and its corresponding second thin-film transistor. In yet other embodiments, the shielding layer 71a, 71b may be disposed between channel regions of the at least the portion of the plurality of first thin-film transistors and channel regions of the at least the portion of the plurality of second thin-film transistors. In FIG. 8, the display device 1 may further comprises an anisotropic conductive film (ACF) film 80, a first insulating layer 81, a second insulating layer 83 and connecting members 85. The second insulating layer 83, the first insulating layer 81, the ACF film 80 and the integrated circuit 628 may be sequentially disposed on the substrate 70. The first insulating layer 81 and the second insulating layer 83 may comprise silicon nitrides (SiNx), silicon oxides (SiOx), or a combination thereof, and may have a plurality of layers.

the display data lines Ldd[1], Ldd[2], Ldd[3] and the sensor data line Lsd[1], Lsd[2] pass through different layers and then are coupled to the integrated circuit 628 via connecting members 85 in vias, contact pads 82 and ACF particles 84. The contact pads 82 comprise a metal material such as copper, tungsten, silver, tin, nickel, chromium, titanium, lead, gold, bismuth, antimony, zinc, zirconium, magnesium, indium, tellurium, gallium, another suitable metal material, an alloy or a combination thereof, and is not limited thereto. Each of the ACF particles 84 comprise a core and a shell, with the core being formed by macromolecules, and the shell formed by a metal or a metal alloy. The material of the shell may be the same as that of the contact pads 82.

Figure 9:
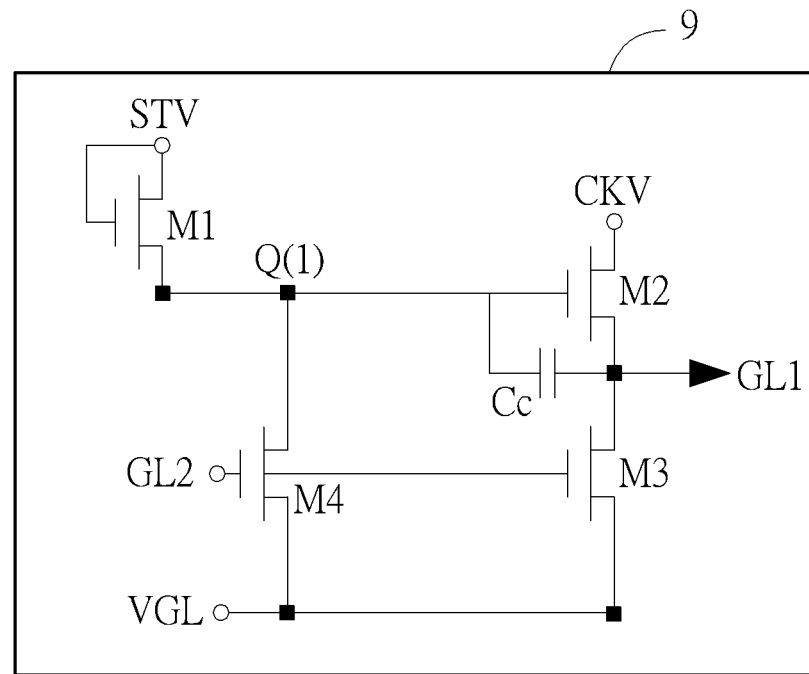
FIG. 9 is a circuit schematic of a gate driver according to an embodiment of the disclosure.

FIG. 9 is a circuit schematic of a gate driver 9 according to an embodiment of the disclosure. The gate driver 9 may serve as the display gate driver 120 or the sensor gate driver 122, may generate a gate line signal for a present row of display units 100 or sensing units 104, and may comprise transistors M1 through M4 and a capacitor Cc. Signals STV, CKV, GL1, GL2, and VGL are a gate line signal for the preceding row, a clock signal, a gate line signal for the present row, a gate line signal of the succeeding row, and a ground reference signal, respectively. The source or drain of the transistor M1 is coupled to the gate of the transistor M2 via a node Q(1). Upon the transistor M1 receiving a high voltage level of the signal STV, the node Q(1) is pre-charged to a high voltage level. Subsequently, the transistor M2 is turned on to pull the signal GL1 to a high voltage level when the signal CKV switches to a high state, while boosting the voltage at the node Q(1) to a higher voltage Vh via the capacitor Cc. The high voltage level of the signal GL1 is passed to the next gate driver 9 for the succeeding row to pull the signal GL2 to the high voltage level. Upon detecting the high voltage level of the signal GL2, the transistors M3 and M4 are turned on to pull the voltage at the node Q(1) and the voltage of the signal GL1 to a low voltage level, thereby completing generation of a pulse for the signal GL1. The signal GL1 may be used to select the present row of display units 100 or sensing units 104.

Figure 10:
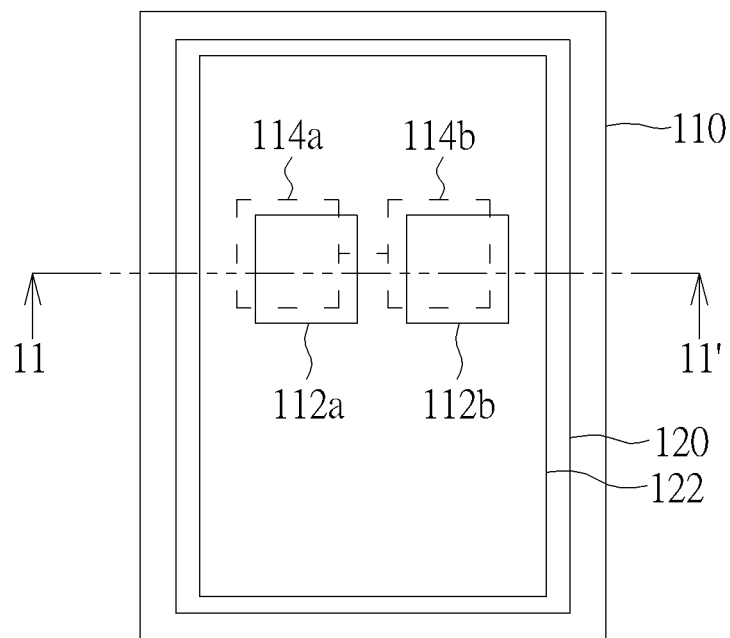
FIG. 10 shows a top view of overlapping transistors in another exemplary circuit layout of the display device in FIG. 1.
Figure 11:
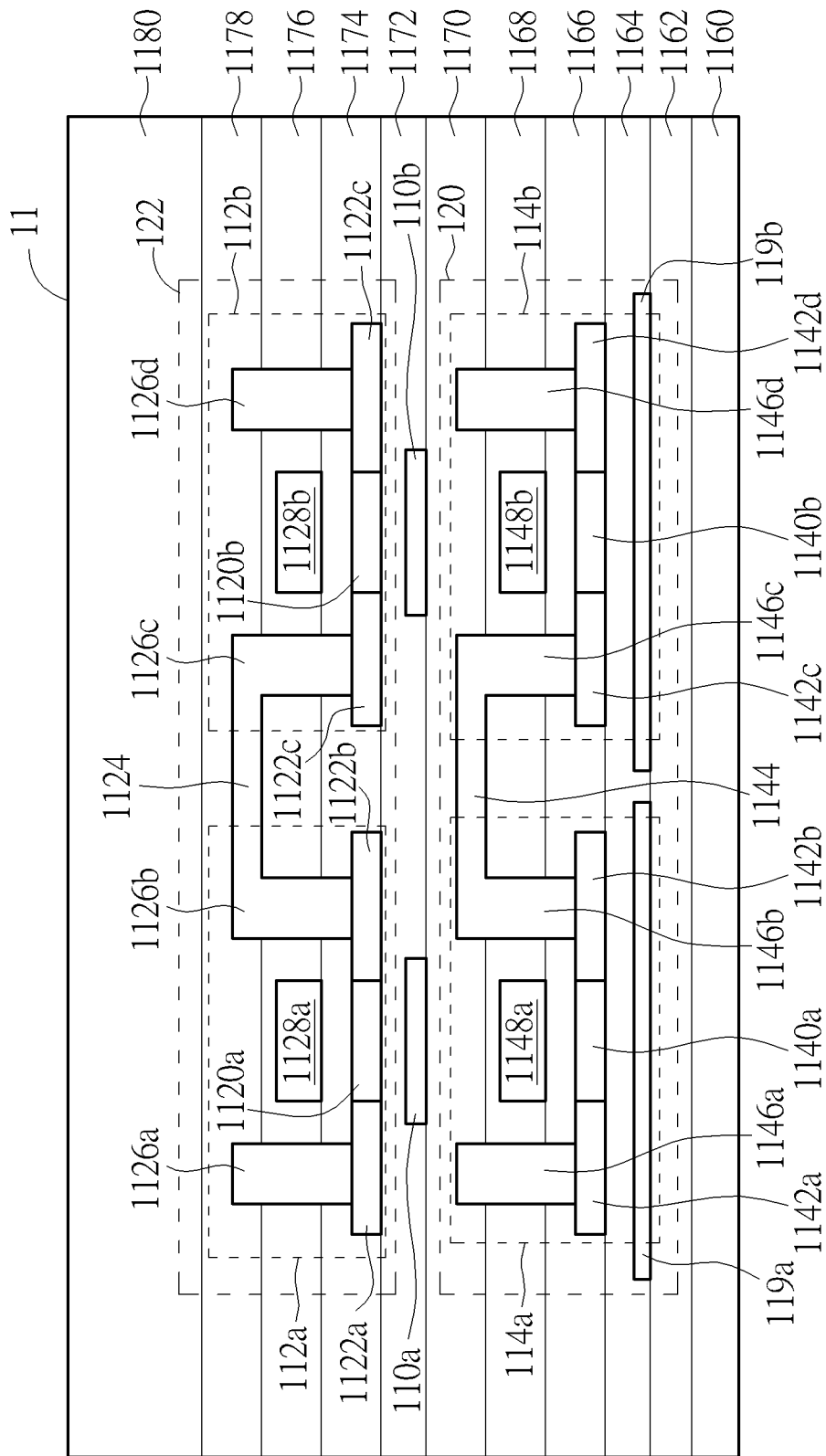
FIG. 11 shows a cross-sectional view of the circuit layout of the display device in FIG. 10 along line 11-11'.
Figure 12:
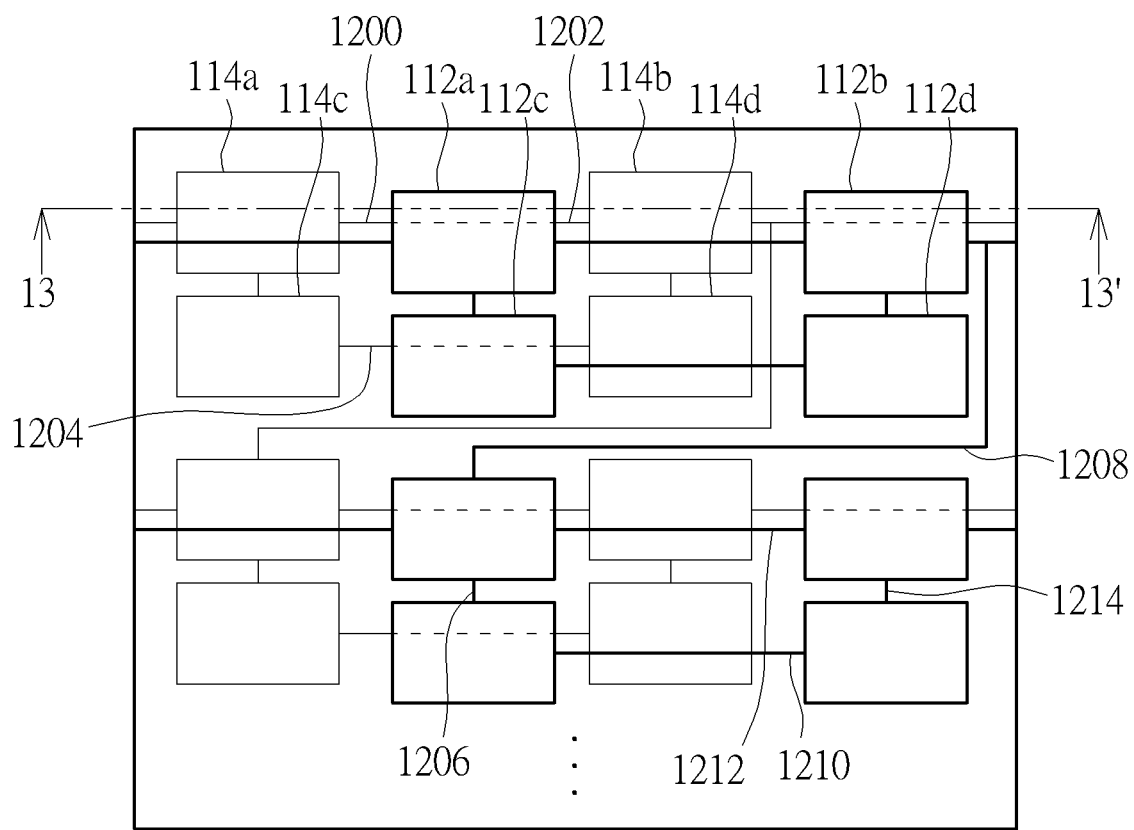
FIG. 12 shows a top view of overlapping transistors on another exemplary circuit layout of the display device in FIG. 1.
Figure 13:
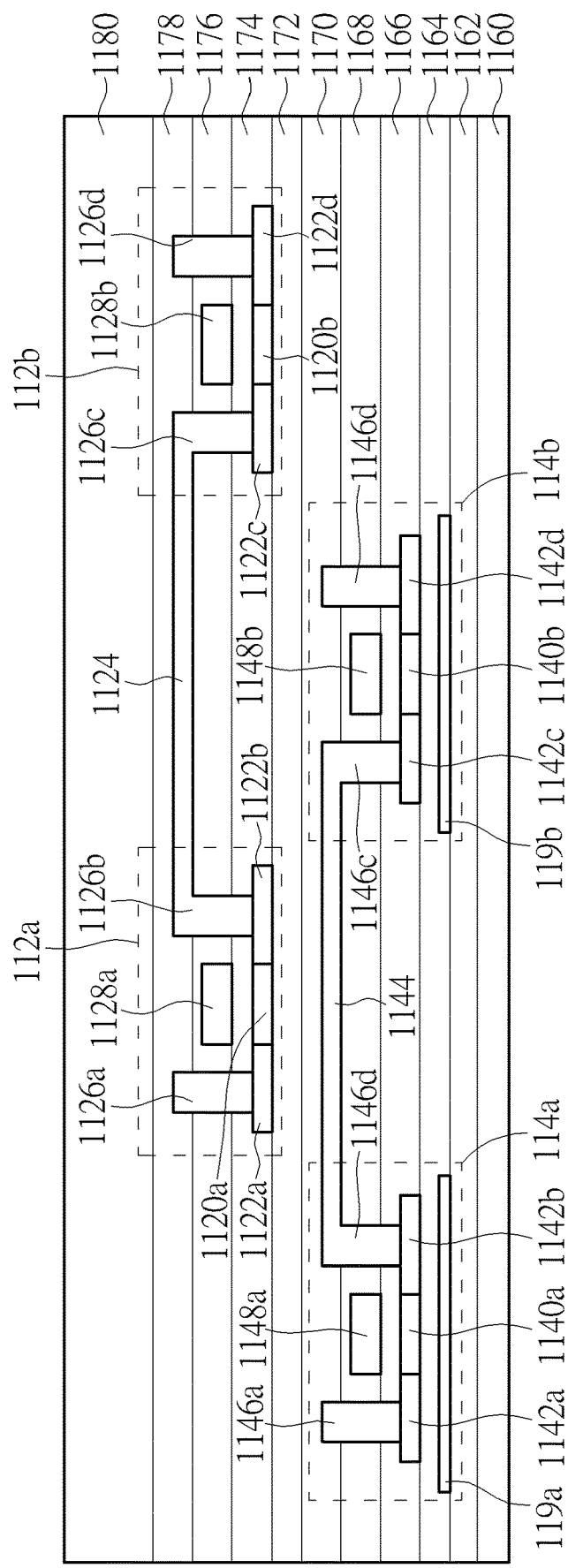
FIG. 13 shows a cross-sectional view of the circuit layout of the display device in FIG. 12 along line 13-13'.

FIGS. 10 and 12 show top views of overlapping transistors on other exemplary circuit layouts of the display device 1, FIG. 11 shows a cross-sectional view of the circuit layout of the display device in FIG. 10 along line 11-11', and FIG. 13 shows a cross-sectional view of the circuit layout of the display device in FIG. 12 along line 13-13'. FIGS. 10 and 11 illustrate that a shielding layer 110 is present between overlapping circuits, and FIGS. 12 and 13 illustrate that overlapping circuits are slightly shifted from each other and no shielding layer is required between the overlapping circuits.

In FIG. 10, the shielding layer 110 is inserted between the display gate driver 120 and the sensor gate driver 122, and the display gate driver 120 comprises two transistors 114a, 114b and the sensor gate driver 122 comprises two transistors 112a, 112b.

In FIG. 11, the transistor 112a is disposed on the transistor 114a, and a shielding pattern 110a is disposed directed between a channel region 1120a of the transistor 112a and a channel region 1140a of the transistor 114a to shield undesired signal coupling between the transistor 112a and the transistor 114a. The transistor 112b is disposed on the transistor 114b, and a shielding pattern 110b is disposed directed between a channel region 1120b of the transistor 112b and a channel region 1140b of the transistor 114b to shield undesired signal coupling between the transistor 112b and the transistor 114b. The channel regions of all transistors of the sensor gate driver 122 form a first channel layer, and the channel regions of all transistors of the display gate driver 120 form a second channel layer. Further, all shielding patterns 110a/110b between the channel regions of the sensor gate driver 122 and the channel regions of the display gate driver 120 form the shielding layer 110. The transistor 112a comprises a source 1122a, a drain 1122b, a gate 1128a, and the channel region 1120a. The transistor 112b comprises a source 1122c, a drain 1122d, a gate 1128b, and the channel region 1120b. The drain 1122b is coupled to the source 1122c via a connecting member 1124. The connecting member 1124 may comprise aluminum, copper, indium tin oxide (ITO), titanium, or a combination thereof. The transistor 114a comprises a source 1142a, a drain 1142b, a gate 1148a, the channel region 1140a, and a light shielding layer 119a. The transistor 114b comprises a source 1142c, a drain 1142d, a gate 1148b, the channel region 1140b, and a light shielding layer 119b. The drain 1142b is coupled to the source 1142c via a connecting member 1144. The connecting member 1144 may comprise aluminum, copper, ITO, titanium, or a combination thereof. The display device 1 further comprises a sequentially disposed substrate 1160, buffer layer 1162, first insulating layer 1164, first gate insulation layer 1166, first inter-layer dielectric 1168, second inter-layer dielectric 1170, second insulating layer 1172, second gate insulation layer 1174, third inter-layer dielectric 1176, fourth inter-layer dielectric 1178 and third insulating layer 1180. The third insulating layer 1180 may comprise an organic material.

In FIG. 12, the four transistors 112a, 112b, 112c, 112d of the sensor gate driver 122 are shifted away from four transistors 114a, 114b, 114c, 114d of the display gate driver 120. Accordingly, the transistors 112a, 112b, 114a, 114b and the display device 1 in FIG. 13 have similar structures to those in FIG. 11, except that the transistors 112a, 112b are shifted from the transistors 114a, 114b respectively in FIG. 13, and therefore, signal switching of the transistors 112a, 112b and the transistors 114a, 114b will not cause interference to each other, therefore no shielding layer is required.

Figure 14:
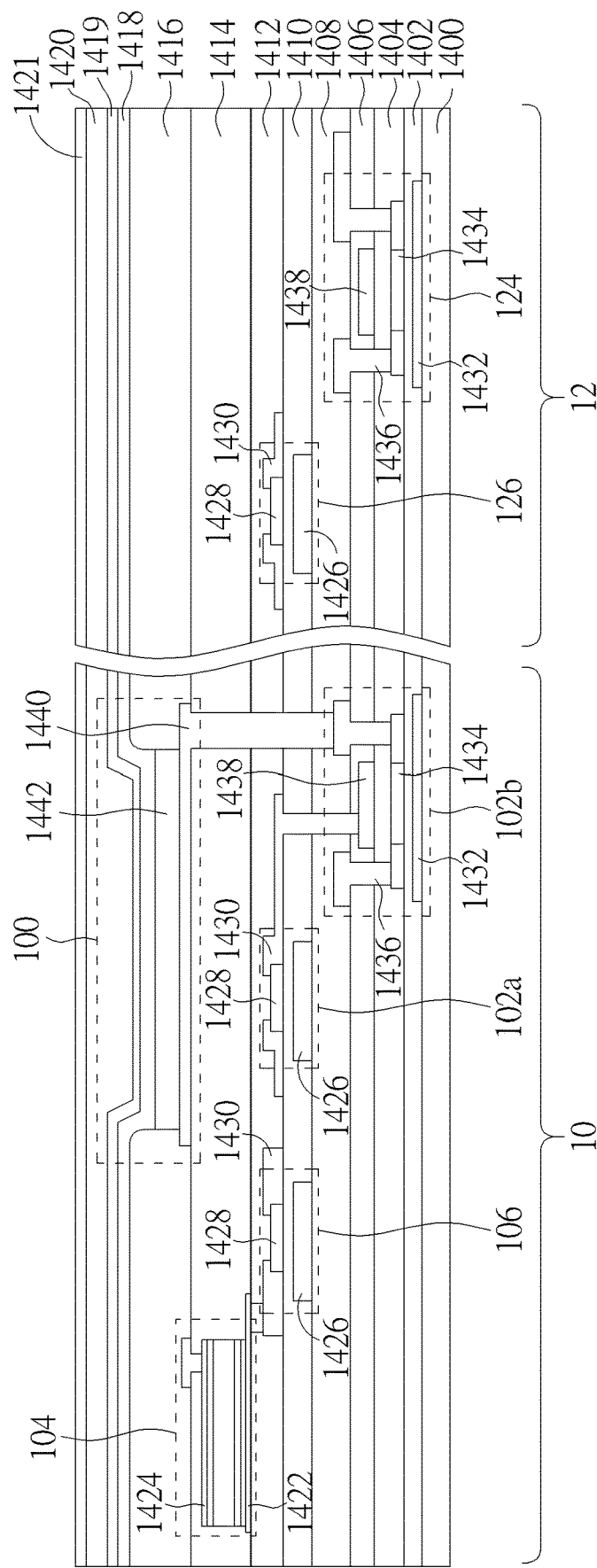
FIG. 14 shows a cross-sectional view of selected devices of the display device in FIG. 1.

FIG. 14 shows a cross-sectional view of selected devices of the display device 1, depicting the display region 10 and the side region 12. In the display region 10, a display unit 100, display driving units 102a, 102b, a sensing unit 104 and a sensor driving unit 106 are provided. In the side region 12, a display data driver 124 and a sensor data driver 126 are provided. At least two of a third channel layer of the display driving unit 102a or 102b, a first channel layer in the display data driver 124 and a second channel layer in the sensor data driver 126 are formed in a same process, thereby simplifying the manufacturing process and reducing manufacturing costs. For example, the material of the third channel layer of the display driving unit 102a or 102b comprises indium gallium zinc oxide (IGZO), low-temperature polycrystalline silicon (LTPS), or combination thereof. The material of the first channel layer in the display data driver 124 comprises LTPS. The material of the second channel layer in the sensor data driver 126 comprises IGZO. The display device 1 comprises a substrate 1400, a buffer layer 1402, a first gate insulator 1404, an inter-layer dielectric 1406, a first back passivation layer 1408, a second gate insulator 1410, a second back passivation layer 1412, a planarization layer 1414, a pixel defining layer 1416, a cathode layer 1418, an inorganic layer 1419, an organic layer 1420, an inorganic layer 1421, an N+doped layer 1422, a P doped layer 1424, a second gate electrode 1426, a second semiconductor layer 1428, a source/drain member 1430, a light shielding layer 1432, a semiconductor layer 1434, a second source/drain member 1436, a gate electrode 1438, an anode layer 1440 and an organic light-emitting diode (OLED) layer 1442.

Figure 15:
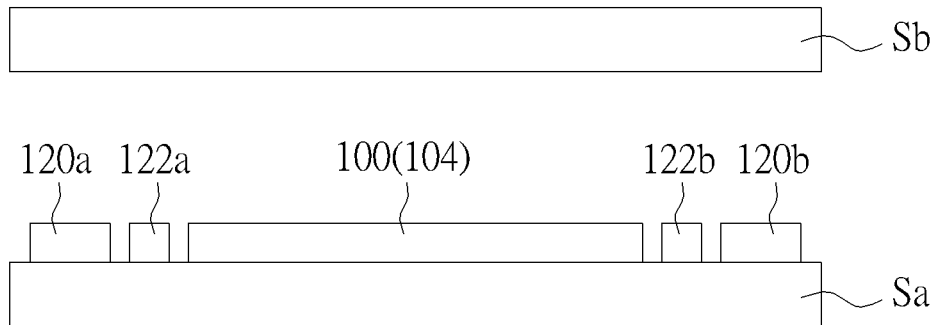
FIGS. 15 through 17 show three cross-sectional views of exemplary circuit layouts of the display device in FIG. 1.
Figure 16:
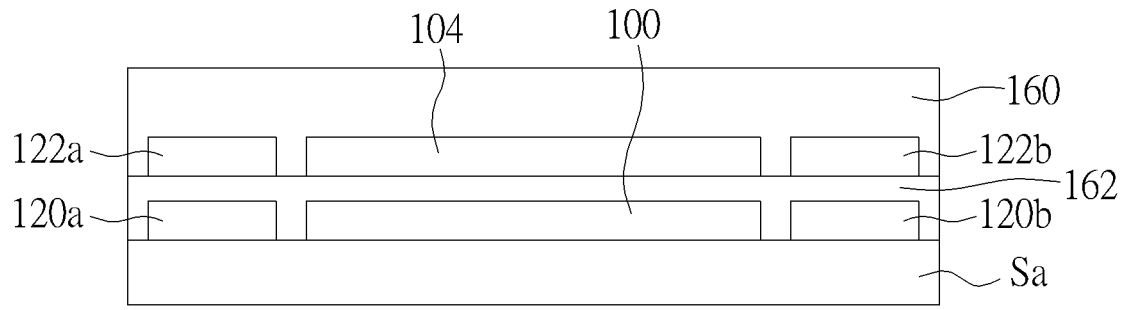
Figure 17:
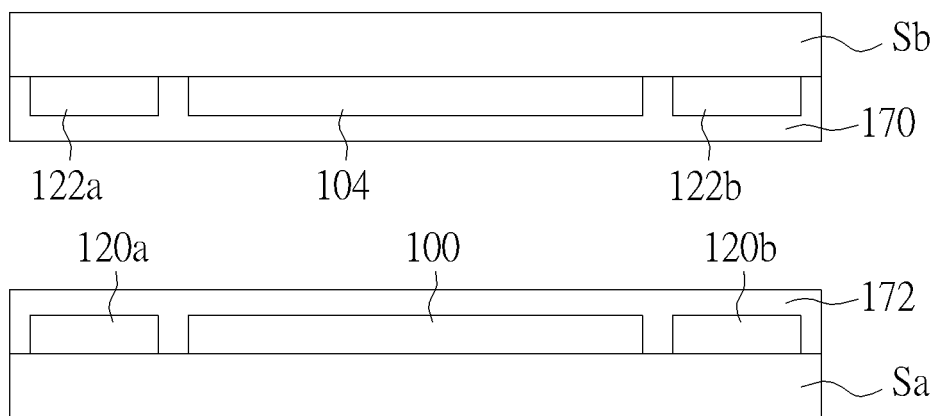

FIGS. 15 through 17 show three cross-sectional views of exemplary circuit layouts of the display device 1, illustrating three cases of circuit layouts in relation to thin-film transistor array substrates. In FIG. 15, the plurality of display units 100, the plurality of sensing units 104, the display drivers 120a, 120b and the sensor drivers 122a, 122b are arranged on a first array substrate Sa and between the first array substrate Sa and a second substrate Sb. In FIG. 16, the plurality of sensing units 104 and the plurality of display units 100 are disposed on an array substrate Sa, and the display drivers 120a, 120b and the sensor drivers 122a, 122b are respectively disposed on the array substrate Sa. In FIG. 17, the plurality of sensing units 104 are disposed on the plurality of display units 100, and the sensor drivers 122a, 122b are disposed on the display drivers 120a, 120b, and the plurality of display units 100, the plurality of sensing units 104, the display drivers 120a, 120b and the sensor drivers 122a, 122b are arranged between two substrates Sa, Sb.

Various circuit configurations of display device 1 in FIGS. 2 through 8 and 10 through 17 allow a biometric sensor to be integrated into a display panel of a display device, increasing a display region of a display device or reducing the size of a frame of the display device while providing biometric authentication.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A display device having a display region and a side region adjacent to the display region, and the display device comprising:
   a plurality of display units and a plurality of sensing units disposed in the display region;
   a display driver, coupled to at least a portion of the plurality of display units, and comprising a plurality of first thin-film transistors having a first channel layer; and
   a sensor driver, coupled to at least a portion of the plurality of sensing units, and comprising a plurality of second thin-film transistors having a second channel layer; and
   a shielding layer disposed between the at least the portion of the plurality of first thin-film transistors and the at least the portion of the plurality of second thin-film transistors in a cross-sectional view of the display device;
   wherein at least a portion of the plurality of first thin-film transistors and at least a portion of the plurality of second thin-film transistors are disposed in the side region.

2. The display device of claim 1, wherein the display driver and the sensor driver are overlapping with each other from a top view direction of the display device.

3. The display device of claim 1, wherein the shielding layer extends throughout an area between the at least the portion of the plurality of first thin-film transistors and the at least the portion of the plurality of second thin-film transistors in the cross-sectional view of the display device.

4. The display device of claim 1, wherein the shielding layer is disposed between each of the at least the portion of the plurality of first thin-film transistors and its corresponding second thin-film transistor in the cross-sectional view of the display device.

5. The display device of claim 1, wherein the first channel layer is not overlapped with the second channel layer from a top view direction of the display device.

6. The display device of claim 1, further comprising a plurality of third thin-film transistors disposed in the display region and comprising a third channel layer, wherein the third channel layer and at least one of the first channel layer and the second channel layer are formed in a same process.

7. The display device of claim 6, wherein a material of the first channel layer and the third channel layer comprises low-temperature polycrystalline silicon.

8. The display device of claim 1, further comprising at least one of a plurality of scan lines coupled to the at least the portion of the plurality of display units and the display driver, and the at least one of the plurality of scan lines extending along a first direction, wherein the display driver and the sensor driver are aligned along a second direction perpendicular to the first direction.

9. The display device of claim 1, further comprising at least one of a plurality of scan lines coupled to the at least the portion of the plurality of display units and the display driver along a first direction, and wherein the display driver and the sensor driver are aligned along the first direction.

10. The display device of claim 1, wherein a top view plane of the display device has a first direction and a second direction perpendicular to the first direction, the side region and the display region are aligned along the first direction, the display driver is a display gate driver and the sensor driver is a sensor gate driver.

11. The display device of claim 9, wherein the side region comprises two side sub-regions arranged at opposite sides of the display region.

12. The display device of claim 1, wherein a top view plane of the display device has a first direction and a second direction perpendicular thereto, the side region and the display region are aligned along the second direction the display driver is a display data driver and the sensor driver is a sensor data driver.

13. The display device of claim 1, further comprising a control circuit coupled to the display driver and the sensor driver, and wherein the control circuit comprises an image processor, a digital signal processor, a central processing unit, a microprocessor, or combination thereto.

14. The display device of claim 1, wherein the display driver and sensor driver are respectively a display data driver and a sensing data driver, and the control circuit, the display data driver and sensor data driver are integrated into one integrated circuit.

15. The display device of claim 1, wherein the plurality of display units and the plurality of sensing units are arranged alternately in the display region.

16. The display device of claim 1, wherein the display driver and the sensor driver are disposed on a first substrate.

17. The display device of claim 1, wherein the plurality of display units, the plurality of sensing units, the display driver and the sensor driver are arranged on a first substrate and between the first substrate and a second substrate.

18. The display device of claim 1, wherein the plurality of sensing units are disposed on the plurality of display units, and the sensor driver are disposed on the display driver, and the plurality of display units, the plurality of sensing units, the display driver and the sensor driver are arranged between two substrates.

19. A display device having a display region and a side region adjacent to the display region, and the display device comprising:
- a plurality of display units and a plurality of sensing units disposed in the display region;
- a display driver, coupled to at least a portion of the plurality of display units, and comprising a plurality of first thin-film transistors having a first channel layer; and
- a sensor driver, coupled to at least a portion of the plurality of sensing units, and comprising a plurality of second thin-film transistors having a second channel layer; and
- a shielding layer disposed between the first channel layer and the second channel layer in a cross-sectional view of the display device;
- wherein at least a portion of the plurality of first thin-film transistors and at least a portion of the plurality of second thin-film transistors are disposed in the side region.

* * * * *